United States Patent [19]

Baldwin et al.

[11] Patent Number: 5,279,892
[45] Date of Patent: Jan. 18, 1994

[54] COMPOSITE AIRFOIL WITH WOVEN INSERT

[75] Inventors: Jack W. Baldwin, West Chester; Brian K. Gracias, Cincinnati, both of Ohio

[73] Assignee: General Electric Company, Cincinnati, Ohio

[21] Appl. No.: 904,429

[22] Filed: Jun. 26, 1992

[51] Int. Cl.$^5$ .............................................. B32B 7/00
[52] U.S. Cl. ................................... 428/257; 428/232; 428/245; 428/246
[58] Field of Search ............... 428/232, 245, 246, 257

[56] References Cited

U.S. PATENT DOCUMENTS

| | | | |
|---|---|---|---|
| 4,268,571 | 5/1981 | McCarthy | 428/236 |
| 4,312,261 | 1/1992 | Florentine | 87/33 |
| 4,471,020 | 9/1984 | McCarthy | 428/309.9 |
| 4,536,438 | 8/1985 | Bishop et al. | 428/246 |
| 4,615,256 | 10/1986 | Fukuta et al. | 87/33 |
| 4,863,660 | 9/1989 | Cahuzac et al. | 54/64 |
| 4,881,444 | 11/1989 | Krauland | 87/8 |
| 4,885,973 | 12/1989 | Spain | 87/1 |
| 4,916,997 | 4/1990 | Spain | 87/1 |
| 4,936,186 | 6/1990 | Sekido et al. | 87/8 |
| 4,988,469 | 1/1991 | Reavlely et al. | 264/113 |
| 5,016,516 | 5/1991 | Aldrich et al. | 87/8 |

*Primary Examiner*—George F. Lesmes
*Assistant Examiner*—Chris Raimund
*Attorney, Agent, or Firm*—Bernard E. Shay; Jerome C. Squillaro

[57] ABSTRACT

Inserting a woven composite layer between laminates of composite material layers where the insert layer comprises composite, carbon fibers woven in a three dimensional weave. The woven insert is injected with a resin material and partially cured prior to deposition of the composite layers. The complete blade is then molded and cured as a unit.

8 Claims, 5 Drawing Sheets

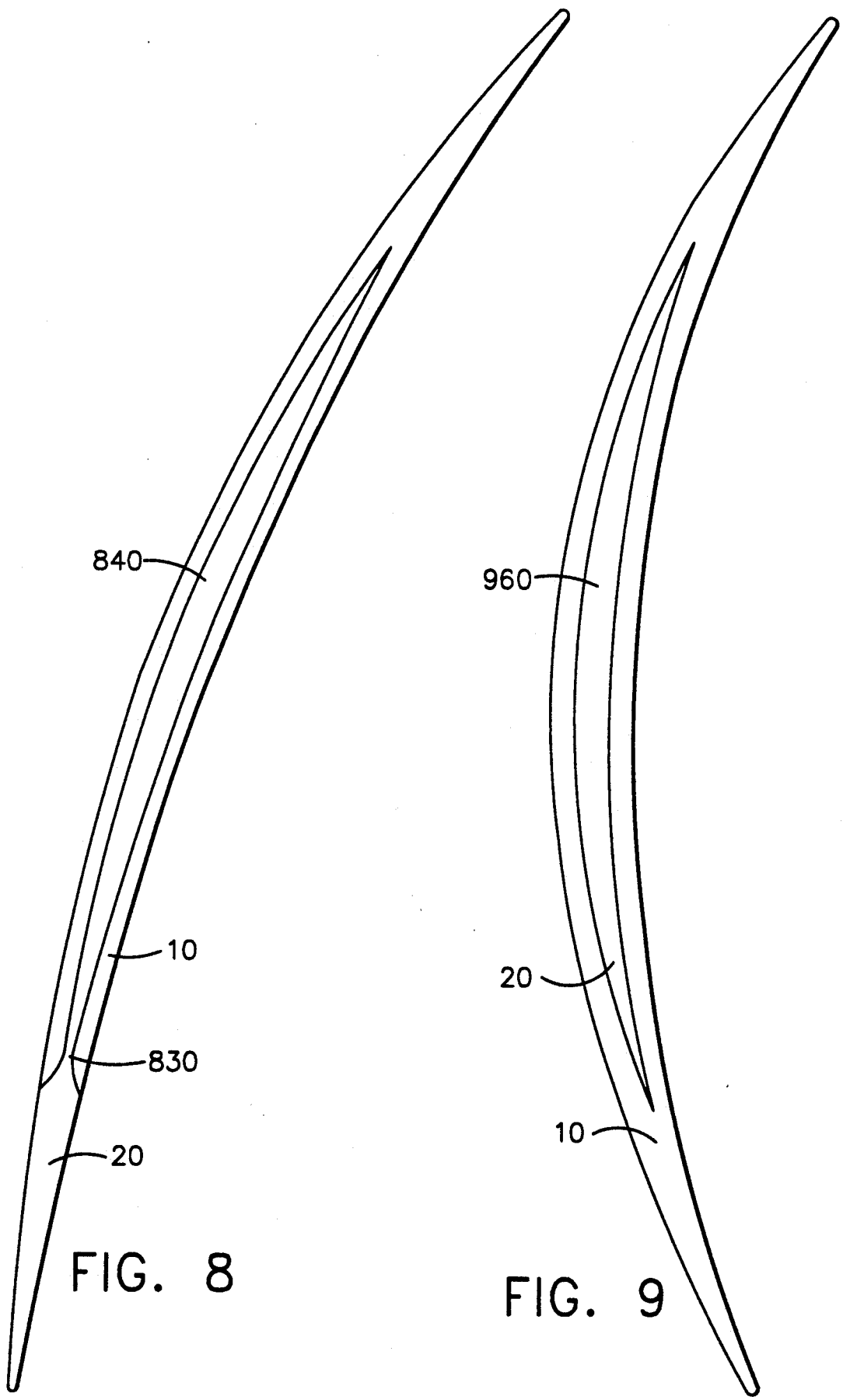

COMPOSITE AIRFOIL WITH WOVEN INSERT

The present invention relates, in general, to composite airfoils (e.g., fan blades) for gas turbine aircraft engines and more particularly to composite airfoils including a woven insert layer.

BACKGROUND OF THE INVENTION

Composite blades developed for commercial aircraft engine fan blades may be constructed of laminated carbon/epoxy "prepreg" material. A "prepreg" is a layer of carbon fibers covered with resin and arranged to form a cloth. Prepreg cloth layers may be layered and cured to form a composite structure. The laminates may experience interlaminar separation under certain circumstances. When laminated fan blades are subject to high energy impacts (e.g., birds, or other foreign objects), the interlaminar separation can result in delamination and a reduction in the blade's structural integrity.

The shear stresses which may tend to delaminate the blade structure are generated when the composite blade is subjected to high twisting and bending loads. These loads normally result from impacts which occur on the leading edge of the blade. When the blade is subjected to an impact, the peak shear stresses tend to be transmitted to the middle of the blade, as well as the leading and trailing edges.

Previous attempts to improve resistance to delamination of composite fan blades have involved, for example, stitching a full size all prepreg blade before cure. Alternatively the blade may have been manufactured of a braided or combination braided/stitched prepreg. It is also known to use a foam or other insert to strengthen a composite blade.

SUMMARY OF THE INVENTION

Inserting a woven composite layer between laminates of composite material layers where the insert layer comprises carbon fibers woven in a three dimensional weave. The woven insert is injected with a resin material and partially cured prior to deposition of the composite layers. The complete blade is then molded and cured as a unit.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 8 is a cutaway view of a leading edge section of a blade including a preform and prepreg combination according to an embodiment of the present invention.

FIG. 9 is a cutaway view of a blade cross section including a preform and prepreg combination according to an embodiment of the present invention.

DETAILED DESCRIPTION OF THE INVENTION

Figure 1:
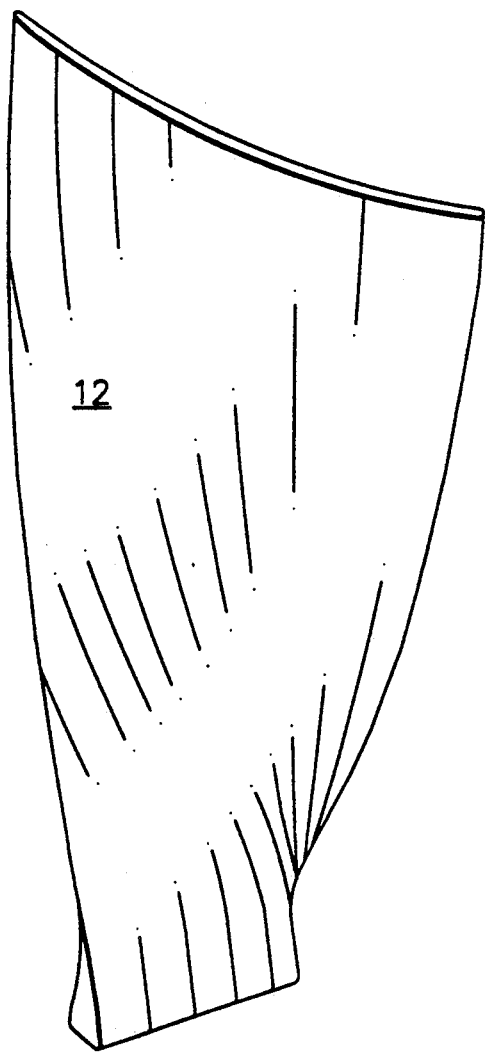
FIG. 1 illustrates a typical composite fan blade.

FIG. 1 illustrates a typical composite fan blade 12 constructed of layers of composite materials (an "all-prepreg blade"). In conventional composite fan blades, the composite layers are impregnated with a resin compound prior to being arranged in a predetermined sequence to form a preform blade. The resin impregnated layers are referred to as "prepreg" layers. The blade is shaped by inserting it into a preshaped blade mold and heat curing the blade until the resin hardens.

Figure 2:
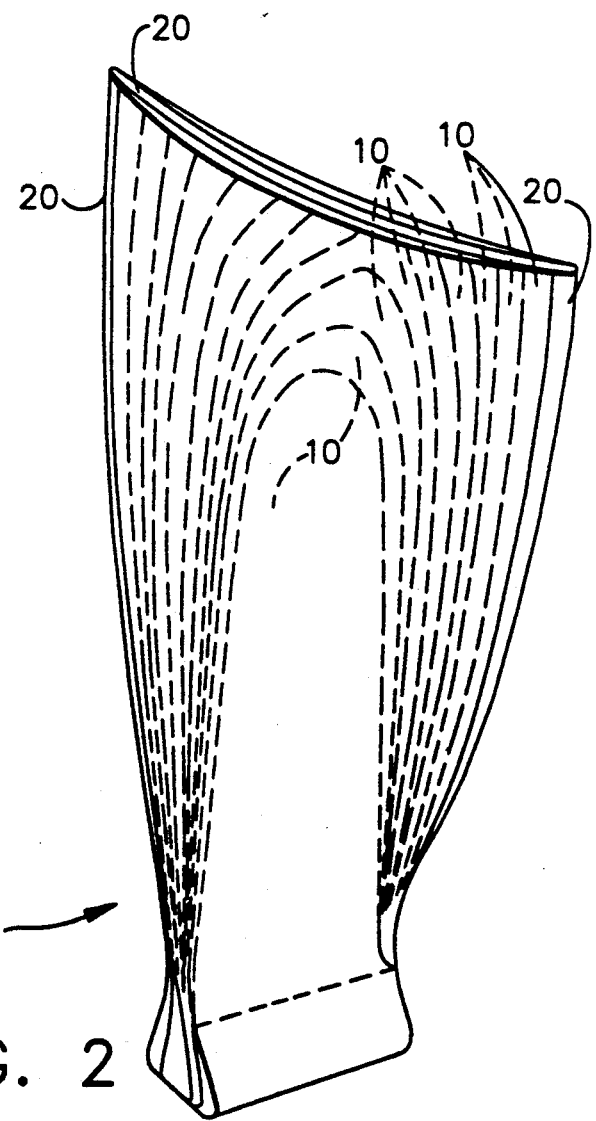
FIG. 2 illustrates a fan blade preform according to the present invention with prepreg outer layers.

FIG. 2 illustrates a blade 30 according to the present invention with prepreg outer layers 10 over a woven insert 20. Woven insert 20 may also be referred to as a "preform". Three-dimensional woven insert 20 forms the core of blade 30. Laminate prepreg skins 10 are layered over woven insert 20 to fill out the fan blade structure and provide the airfoil shape. Prepreg skins 10 also add structural stiffness to blade 30.

Figure 3:
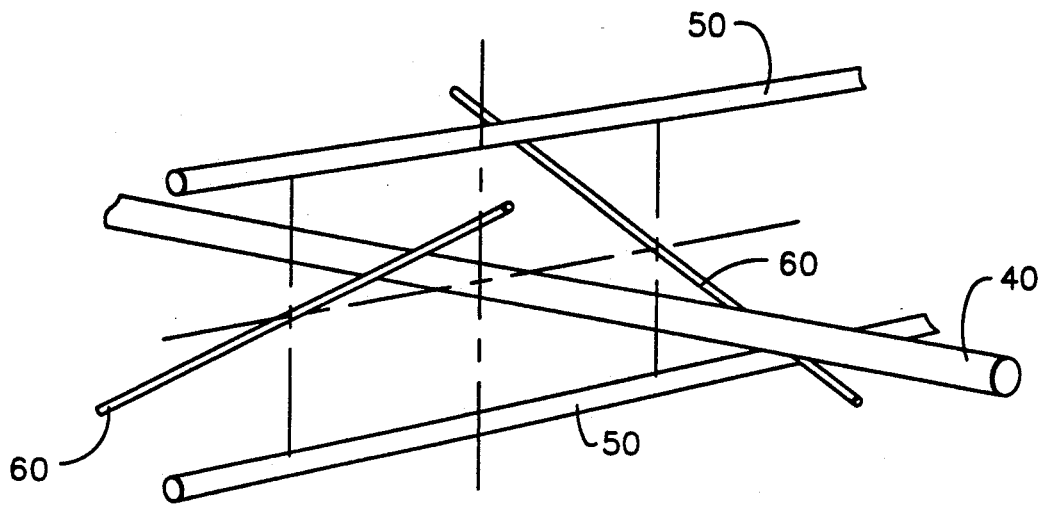
FIG. 3 is a schematic illustration of a typical fiber architecture in a woven insert according to the present invention.

The fiber volume content of woven insert 20 is preferably 50–60% of the total insert volume. The fiber architecture of a woven insert according to the present invention is illustrated schematically in FIG. 3. The fibers illustrated in FIG. 3 are preferably selected such that fiber 40 in the warp (X) direction comprises approximately 50% of the total fiber volume while fibers 50 in the fill (Y) direction comprise approximately 25% of the total fiber volume and fibers 60 in the through-thickness (Z) direction comprise approximately 25% of the total fiber volume. In embodiments of the present invention, fibers 40 in the warp direction may comprise 50 to 60% of the total fiber volume while fibers 50 in the fill direction may comprise approximately 20 to 35% of the total fiber volume and fibers 60 in the through-thickness direction comprises approximately 5 to 30% of the total fiber volume. As illustrated in FIG. 3, fibers 60 in the through-thickness (Z) direction alternate at angles of approximately ±45° from fibers 40 in the warp (X) direction. In embodiments of the present invention, fibers 60 in the through thickness direction may alternate at angles of approximately 40 to 60 degrees from fibers 40 in the warp direction.

In the root part of the blade, through-thickness fibers 60 may be oriented substantially perpendicular to the blade surface, resulting in an angle of up to approximately 60° between warp fibers 40 and through thickness fibers 60.

It will be apparent to those of skill in the art that the yarn size used in weaving the insert will be a function of a number of variables including the thickness of the insert, the weaving equipment, the fiber volume and the loads the fiber is expected to bear. In one embodiment of the present invention, the preferred yarn size is 12K (where K is the number of filaments in thousands). A filament is the smallest individual unit in the yarn, a single fiber. However, yarn sizes of 24K or 48K filaments may also be used advantageously in weaving an insert according to the present invention.

The woven insert, once complete, comprises the core of the blade. According to the present invention, the woven insert may presently be resin-transfer-molded and partially cured to form a base for the prepreg layers. The preform may then be sandwiched between prepreg layers within the blade mold. The prepreg layers and the woven layer are co-cured in the mold to form a rough blade. Finishing Operations including cutting and polishing, occur as needed, to form a finished blade.

In an alternative embodiment of the present invention, a film adhesive layer may be used between the innermost prepreg layer and the preform. The adhesive film being designed to cure at the same temperature as the prepregs and the preform.

The process for manufacturing a blade according to the present invention combines technology from three areas: three-dimensional (3-D) weaving, resin transfer molding (RTM) and autoclave/compression molding. In an embodiment of the present invention, the 3-D woven insert is injected with resin and partially cured. The partially cured insert is removed from the RTM tooling and transported to another tool in which toughened prepreg layers are laid over the resin filled partially cured woven insert in sequence (this may be done by hand or using a tape laying machine). The part is then moved to a cure tool and prepared for cure using conventional autoclave or compression molding techniques.

Figure 4:
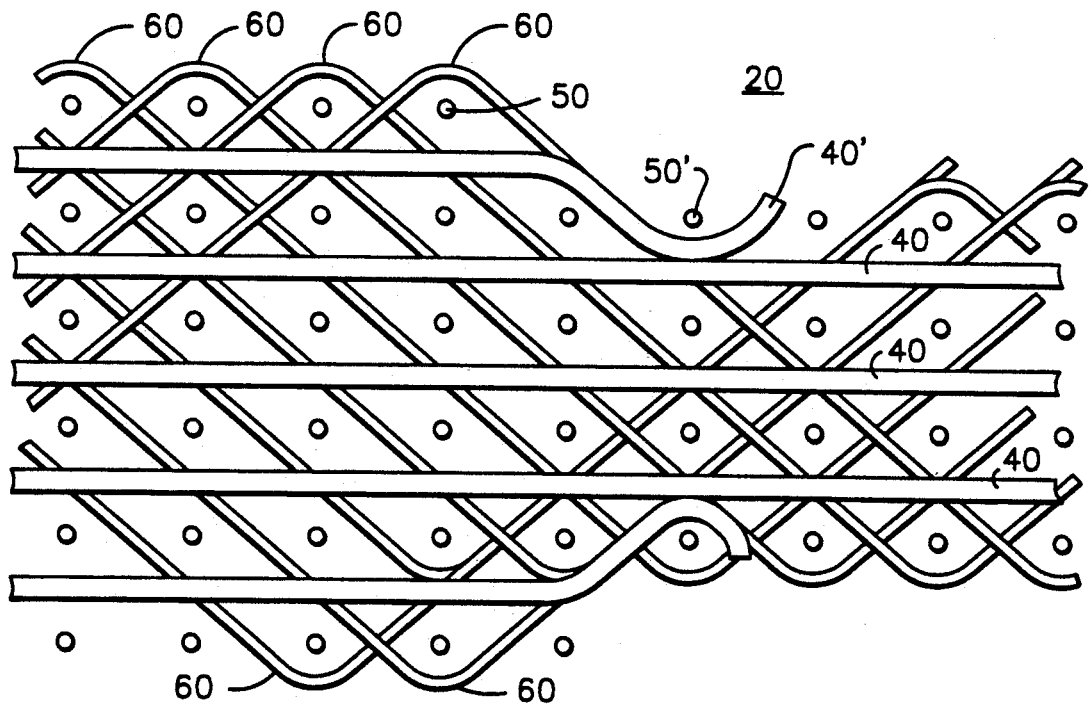
FIG. 4 is a schematic illustration of an upright section through a three-dimensional woven insert according to the present invention.

FIG. 4 is a cross sectional view of a woven insert according to the present invention. In FIG. 4, warp fibers 40 intersect fill fibers 50 at approximately right angles to form layers of the woven insert. The layers are held together by interwoven through-thickness fibers 60. Woven insert 20 may be shaped by, for example, cutting predetermined warp fibers 40 (for example, warp fiber 40'). In the embodiment of FIG. 4, the warp fiber is locked into place to prevent the woven insert from unraveling, by, for example, weaving it under fill fiber 50'. In shaping the woven insert in the fill direction, fill fibers 50 would likewise be cut off and locked in place under warp fibers 40 to prevent unraveling. Through thickness fibers 60 are woven around warp 40 and fill 50 fibers according to the thickness of the woven insert.

Figure 5:
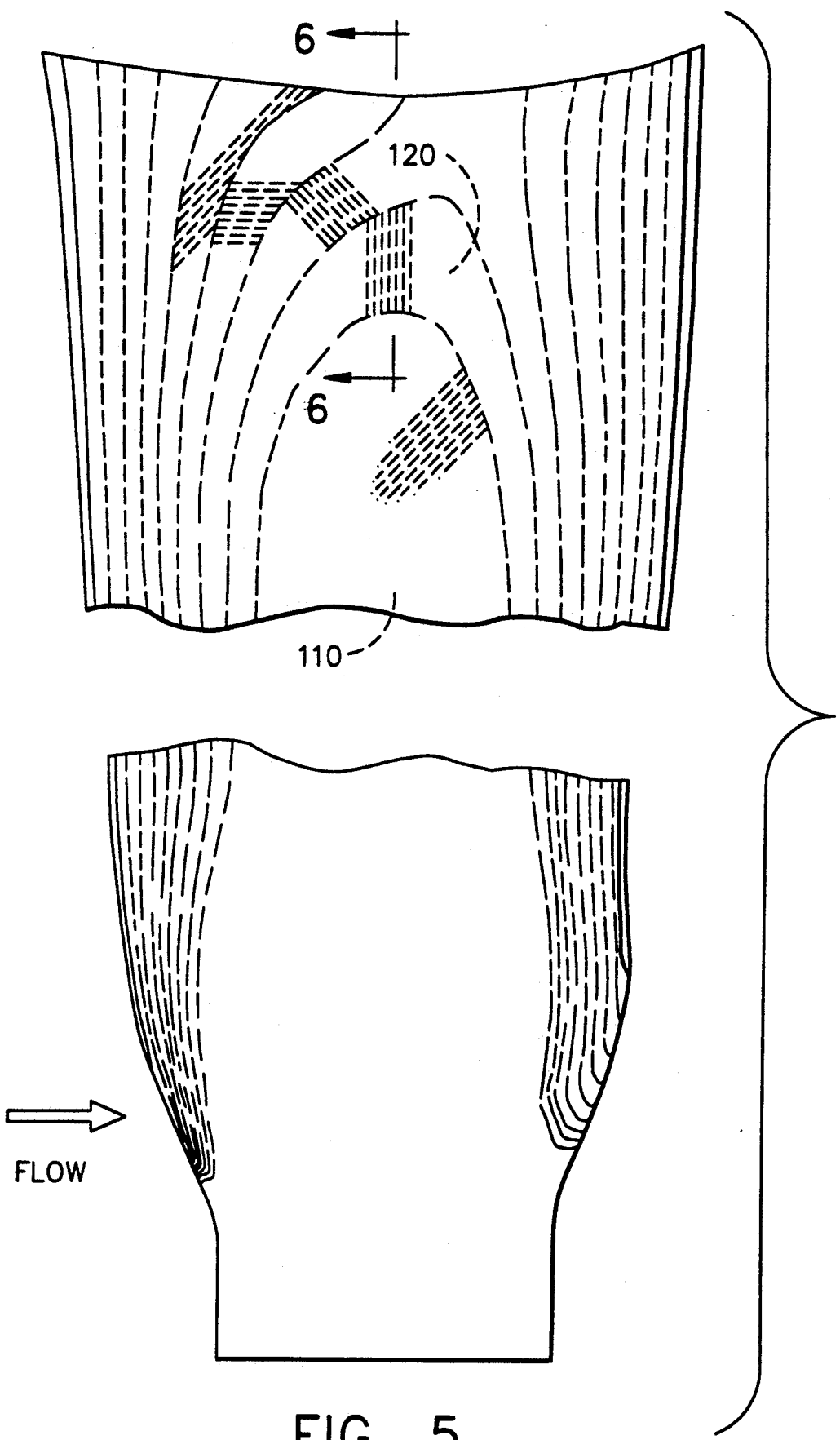
FIG. 5 is a side elevation schematic of a portion of a composite blade according to the present invention with various prepreg layers exposed.

FIG. 5 illustrates the layup of prepreg layers according to the present invention. Prepreg layers are formed from sheets of unidirectional intermediate modulus, high strain carbon fibers which are coated with resin. Prepreg layers take on a "grain" according to the orientation of the fibers. FIG. 5 illustrates a composite blade according to the present invention in which the grain orientation of various prepreg layers is shown. In a preferred embodiment of the present invention, illustrated in FIG. 5, the grain orientation of each prepreg layer is rotated by approximately 45° with respect to the grain orientation of the adjacent prepreg layers in the stack. For example, the grain of layer 110 is rotated 45° from the grain of layer 120. By rotating the grain orientation of adjacent layers, the strength and stiffness of the stack may be customized to the loadbearing requirements of the blade.

Figure 6:
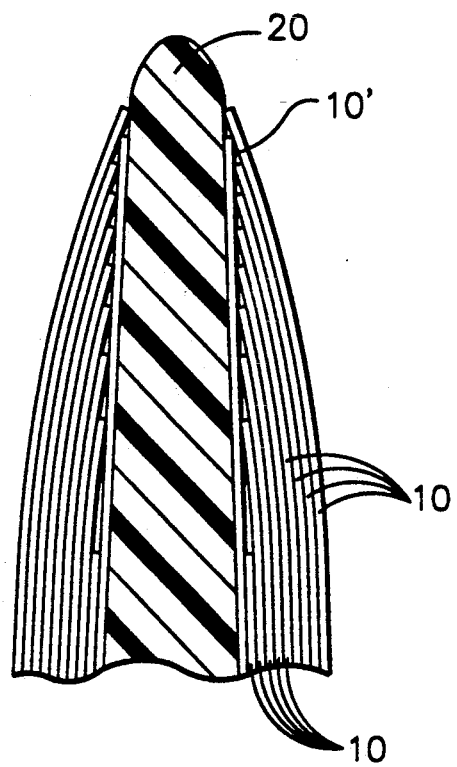
FIG. 6 is a cutaway view of a leading edge of a typical blade according to an embodiment of the present invention.

FIG. 6 is a cutaway view of a leading edge according to the present invention wherein prepreg layers 10 overlie a central woven insert 20. FIG. 6 may, alternatively represent an illustration of an embodiment of a trailing edge of a blade according to the present invention. In the embodiment of FIG. 6, outer prepreg layers 10 are successively shorter with the exception of transition layer 10' which is longer than every other prepreg layer except the outermost prepreg layer 10".

In FIG. 6, transition layer 10' may comprise, for example, a prepreg layer similar to prepreg layers 10. Alternatively, transition layer 10' may be a woven non-unidirectional fabric or an adhesive layer. Transition layer 10' may, be referred to as a load transition layer since stresses imposed upon woven insert 20 are transitioned through layer 10' to prepreg layers 10 and from prepreg layers 10 to woven insert 20.

Figure 7:
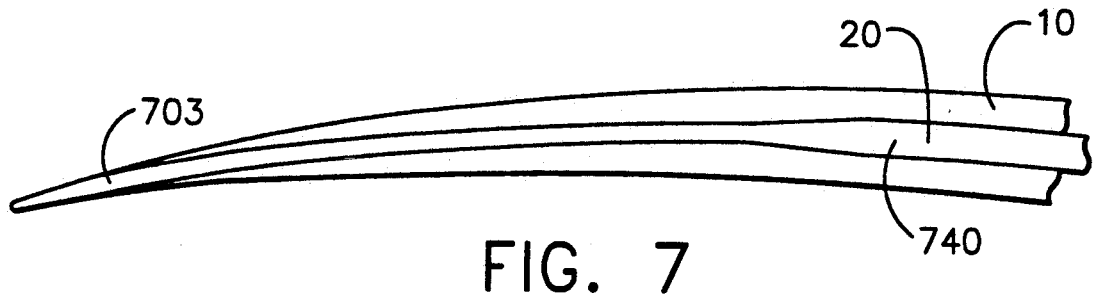
FIG. 7 is a cutaway view of a leading edge section of a blade including a preform and prepreg combination according to an embodiment of the present invention.

FIGS. 7 and 8 illustrate alternative embodiments of the present invention wherein insert 20 is surrounded by prepreg layers 10. In FIG. 7, the thickness of woven insert 20 is substantially uniform from the tip 703 to the central portion 740. The woven insert is thicker in the central portion 740. The trailing edge is not shown but would be substantially identical. In FIG. 8, woven insert 20 narrows rapidly between prepreg layers 10 in region 830 expanding substantially uniformly to the central region 840.

FIG. 9 illustrates an alternative embodiment of the present invention. In FIG. 9, the central region 960 is a woven insert surrounded by prepreg layers 10. Prepreg layers 10 come together at a camberline of the blade.

A 3-D Woven Insert according to the present invention brings several advantages to a blade design. Classical theory indicates that the highest stresses are along the camber line. Therefore, removing lamination interfaces from the camber line reduces opportunity for delamination. In a blade according to the present invention, the plane of maximum stress lies within the woven insert. Therefore, the stress at the lamination interface is reduced and structural delamination is less likely to occur. Thus, the present invention provides stiffness in the region of higher/highest shear stress while maintaining torsional stiffness in the tip area and flexural stiffness in the root area. The woven fiber architecture greatly increases interlaminar strength. The through-thickness fibers of the woven insert act to hold the woven insert together, suppressing delamination. This arrangement enhances structural integrity and residual strength.

The woven insert also enhances producibility. The preform eliminates the hundreds of prepreg layers, especially in the thick root sections. In addition, partially curing the resin eliminates the need to machine a totally cured preform to net shape prior to layup of the toughened prepreg since the 3-D woven insert is not fully cured before application of the prepreg. The preform assumes its final shape during final cure.

According to one embodiment of the present invention, the fibers used to weave the woven insert may comprise yarn-carbon fibers. Alternatively, the fibers may comprise yarn-glass fiber, for example, Owens-Corning 52.

According to one embodiment, the prepreg resin and the RTM resin may be 350° F. cure epoxies. Alternatively, a toughened no shrink high Tg (glass transition temperature) injectable resin that cures at the same temperature as the prepreg resin may be used.

In the procedure described herein, a partially-cured woven insert is skinned (covered with prepreg layers) with unidirectional prepreg layers. In an alternative embodiment of the manufacturing method according to the present invention (the "all-RTM" or "three-preform" method). A dry woven insert is skinned with dry (not prepregged) unidirectional fibers. The assembly may be stitched together while dry. Finally, the assembly may be placed in an RTM tool, injected, and completely cured.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What we claim is:

1. A composite airfoil structure comprising:
   outer layers of composite prepreg material surrounding a three-dimensional woven insert layer, wherein said woven insert layer includes fiber layers interwoven with strengthening fibers which are arranged to bind said fiber layers together;
   said prepreg material comprises carbon fibers coated with a resin compound in a unidirectional sheet; and
   said woven insert layer comprises carbon fibers woven in a warp direction woven with carbon fibers in a fill direction at an angle of approximately 90° to said warp direction and strengthening fibers woven at a through-thickness direction at an angle of approximately 45° to said warp direction and 90° to said fill direction.

2. A composite structure according to claim 1 wherein:
   said woven insert layer includes spaces between said carbon fibers, and said spaces being filled with an injectable resin compound.

3. A composite airfoil structure comprising:
   a three-dimensional woven insert comprising carbon fibers woven in a warp direction woven with carbon fibers in a fill direction at an angle of approximately 90° to said warp direction and strengthening fibers woven at a through-thickness direction at an angle of approximately 45° to said warp direction and 90° to said fill direction;
   first and second load transition layers disposed on either side of said woven insert said load transition layers selected from the group consisting of a prepeg, a woven fabric and an adhesive;
   a plurality of prepreg layers disposed over said load transition layers;
   an outer fabric prepreg layer disposed over said plurality of prepreg layers wherein said outer fabric prepreg layer is larger than said load transition layer and contacts said woven insert.

4. A composite airfoil structure according to claim 3 wherein:
   said load transition layer comprises a prepreg layer.

5. A composite airfoil structure according to claim 3 wherein:
   said load transition layer comprises a fabric prepreg layer.

6. A composite airfoil structure according to claim 3 wherein:
   said load transition layer comprises an adhesive layer adapted to bond said woven insert to said prepreg layers.

7. A composite airfoil according to claim 3 wherein:
   said prepreg layers are deposited such that said grain of each layer is rotated approximately 45° from the grain of a preceding layer.

8. A composite airfoil comprising:
   a three-dimensional woven central region including carbon fibers in a warp direction woven with carbon fibers in a fill direction at an angle of approximately 90° to said warp direction and carbon fibers in a through-thickness direction woven at an angle of approximately 45° to said warp direction and 90° to said fill direction and held in place by resin compound;
   first and second load transition layers on either side of said woven central region said load transition layers selected from the group consisting of a prepeg, a woven fabric and an adhesive;
   prepreg layers comprising carbon fibers coated in resin and arranged in a grain pattern wherein said prepreg layers overlie said load transition layers.

* * * * *